Aug. 21, 1923.

F. MOSSBERG

SPOOL

Filed Oct. 8, 1920

1,465,585

Inventor

Frank Mossberg

By Howard E Barlow

Attorney

Patented Aug. 21, 1923.

1,465,585

UNITED STATES PATENT OFFICE.

FRANK MOSSBERG, OF ATTLEBORO, MASSACHUSETTS, ASSIGNOR TO MOSSBERG PRESSED STEEL CORPORATION, OF ATTLEBORO, MASSACHUSETTS, A CORPORATION OF MASSACHUSETTS.

SPOOL.

Application filed October 8, 1920. Serial No. 415,585.

*To all whom it may concern:*

Be it known that I, FRANK MOSSBERG, a citizen of the United States, residing at Attleboro, in the county of Bristol and State of Massachusetts, have invented certain new and useful Improvements in Spools, of which the following is a specification.

This invention relates to spools and the like upon which yarn, wire or other material may be wound, and has for its object to provide a member connected to the heads of the spool for centralizing the tubular body of the spool relative to the heads thereof.

The nature and advantages of the invention will be better understood when the following detail description is taken in connection with the accompanying drawings, the invention residing in the combination and arrangement of parts as claimed.

In the drawings forming part of this specification, like numerals of reference indicate similar parts in the several views and wherein:—

With reference to the drawings, 10 designates the body portion of a spool, reel or beam, to the opposite ends of which the head members 11 are shown as being connected by means of clamping bolts 12, but any suitable means for securing these heads to the body may be employed.

Figure 1:
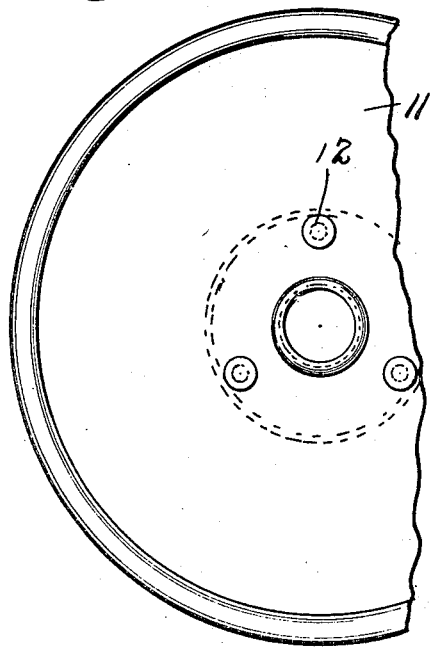
Figure 1 is an end view showing a portion of one of the heads of the spool.
Figure 2:
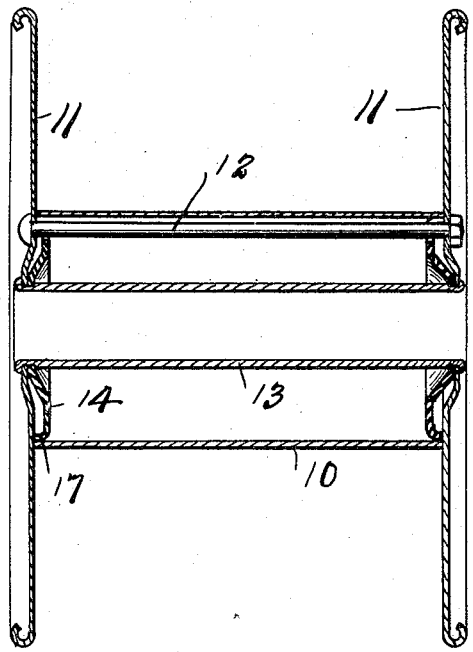
Figure 2 is a sectional side elevation through the spool.
Figure 3:
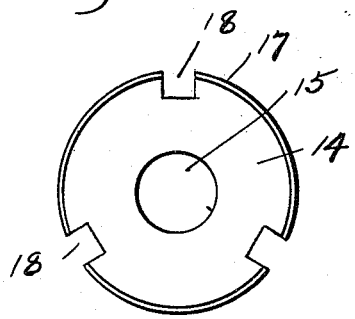
Figure 3 is a front view of the centralizing disk, showing it notched on its margin to permit the passage of the clamping bolts therethrough.

I have also shown in Figure 2 a central, tubular, bearing member 13 extending through and connecting together the head members 11.

Figure 4:
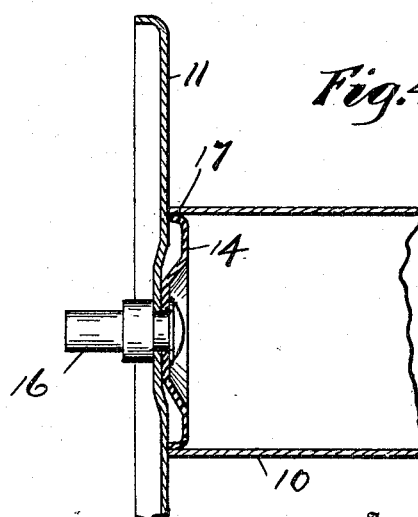
Figure 4 is a view showing a trunnion or another form of central bearing member from that illustrated in Figure 2.

In the construction of spools or reels of this character, it is found essential to provide simple and effective means for centralizing the body portion 10 with reference to its heads 11 and to accomplish this in a simple and practical way, I have provided a centralizing plate or member 14 which comprises a disk having a central opening 15 through which it is centrally secured in position to its head by the center bearing which in Figure 2 is shown as being a tube while in Figure 4 it is shown as being a solid trunnion member 16, both of which serve to secure by riveting or otherwise this centralizing disk to its head-plate 11.

It is found in practice desirable to round the inner peripheral edge 17 of each disk to facilitate the forcing or driving of the body portion 10 thereover, which rounding or turning of these edges may be accomplished by a pressing or swaging operation.

When clamping bolts 12 are employed for binding the heads against the ends of the tubular body, I preferably provide peripheral notches 18 in this disk through which these binding bolts may be passed.

My improved spool is extremely simple and inexpensive in construction and by the use of its centralizing disks which have their peripheral edges turned outwardly, the body portion may be forced with a driving fit over these edges and so serve to support this body centrally relative to the heads.

I have herein shown my centralizing disk as applied to a spool construction, but the same may be applied to reels, beams or any other similarly constructed device.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A spool of sheet material comprising a tubular body having a head at either end, and a separate disk at either end of the body having its outer face set adjacent to and its central portion secured against the inner face of its head, the peripheral edge of said disk being of a size to tightly fit and centralize said body, said edge being turned or rounded from its inner face outwardly to facilitate the forcing of said tubular body thereonto.

In testimony whereof I affix my signature.

FRANK MOSSBERG.